May 2, 1961 M. R. COOLEY 2,982,081
AGRICULTURAL IMPLEMENT AND MOUNTING MEANS THEREFOR
Filed July 13, 1951 3 Sheets-Sheet 1

MORRIS R. COOLEY
INVENTOR
HUEBNER, BEEHLER,
WORREL & HERZIG
ATTORNEYS
BY

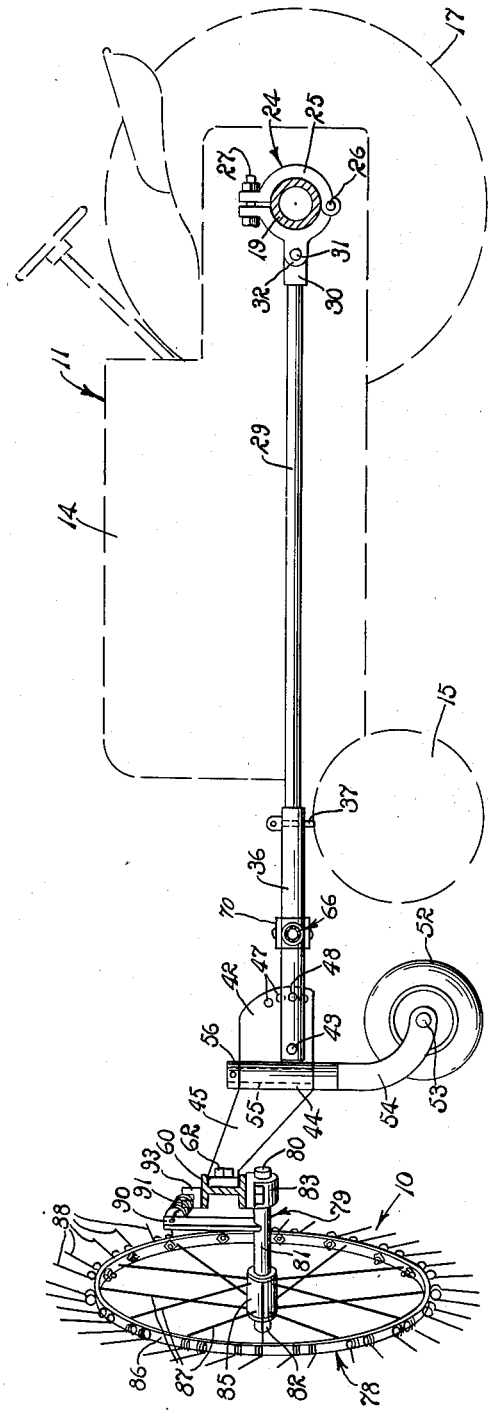

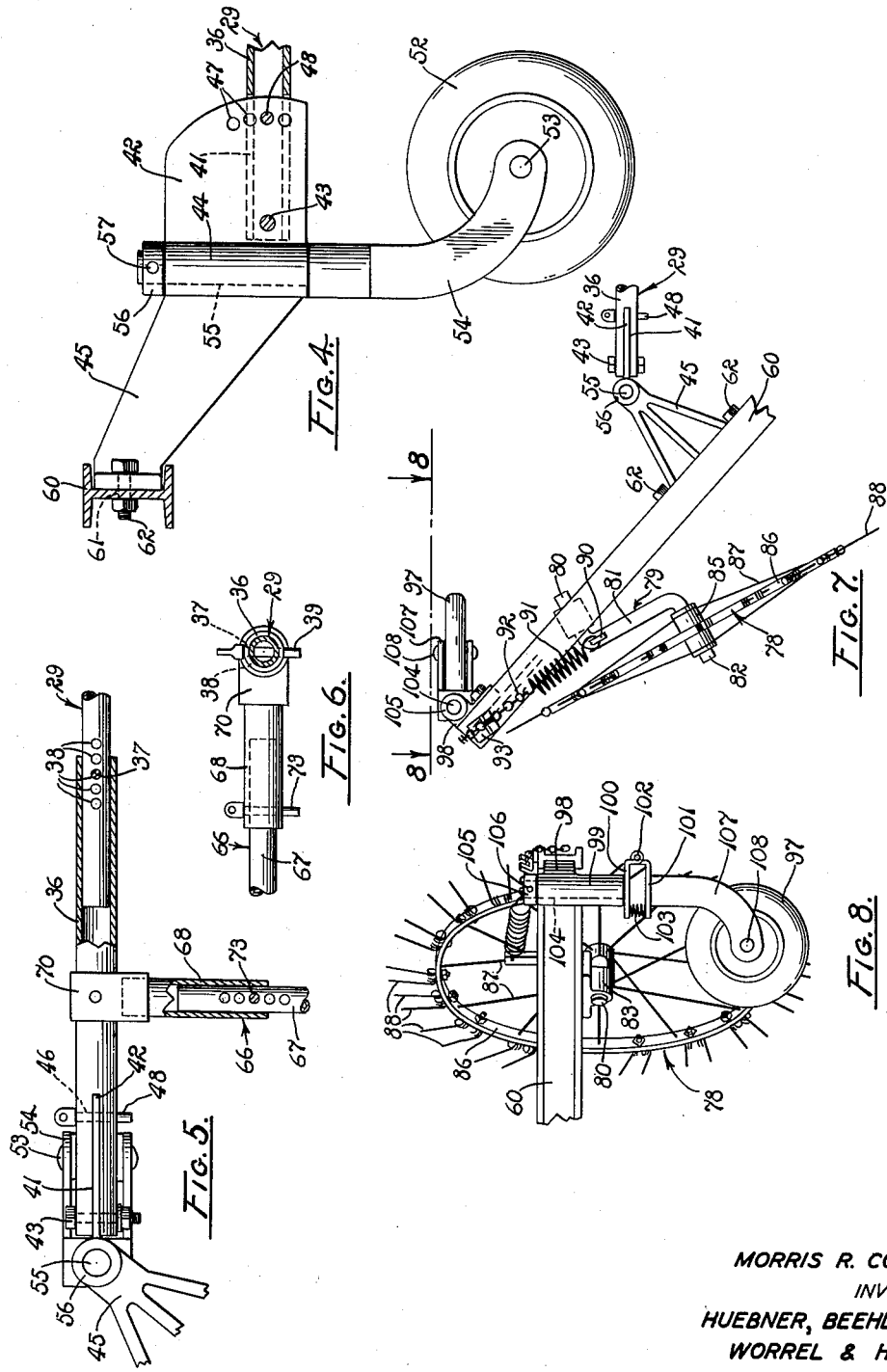

United States Patent Office 2,982,081
Patented May 2, 1961

2,982,081

AGRICULTURAL IMPLEMENT AND MOUNTING MEANS THEREFOR

Morris R. Cooley, Tulare, Calif., assignor, by mesne assignments, to Daffin Corporation, a corporation of Delaware Filed July 13, 1951, Ser. No. 236,561

2 Claims. (Cl. 56—377)

This invention relates to side delivery rakes, and basically utilizes features shown and claimed in the United States patents granted to Melvin A. Morrill, No. 2,447,-354, and No. 2,472,260.

The rakes of the Morrill patents are illustrated as trailing behind a tractor, and although in his description Morrill recognizes that such a rake may be coupled in front of a tractor to operate as a pusher or buck type, he does not disclose structural details of the latter type of rake, or coupling, and the present application concerns the adaptation of the Morrill principle to a pusher rake.

The rakes disclosed in the Morrill patents comprise mobile frames adapted to be moved by a tractor in a given line of travel, and toothed ground engaging raking wheels mounted on the frame in echelon angularly (obliquely) disposed with reference to this line of travel and freely rotatable by contact of the teeth with the ground or crops thereon.

An object of the present invention is to provide a rake of the Morrill type in the form of a tractor front mounted, pusher rake.

Another object of the invention is to provide a mounting means for coupling a Morrill type rake in front of a tractor for propulsion by the latter.

It is important that a rake of the character described travel in a line parallel to the path of travel of the tractor notwithstanding a side twisting force imparted by the resistance offered by the hay or other crops being raked. I have discovered that this is best achieved in a pusher rake by a coupling between rake and tractor which resists side sway of the rake, but which yields to up and down movement of the rake relative to the tractor. This latter function becomes necessary in uneven ground, as for example, in traversing irrigation checks in alfalfa fields.

It is desirable also to be able adjustably to vary the angle of the rake relative to the line of travel, one effect of which is to change the width of the swath raked.

A pusher rake may be entirely tractor mounted, without self-contained ground supporting means, and a rake thus mounted will function on level ground. When thus constructed, the coupling to the tractor should be rigid so that it resists both lateral and vertical shifting of the rake relative to the tractor. At least there should be a limit to the falling of the rake below the horizontal plane of the tractor, although a stop for this purpose even may be omitted if the rake is relatively light and well balanced.

The preferable construction, however, which renders the rake more universal for use under varying conditions, is to utilize a coupling which rigidly resists side sway but permits vertical movement of the rake, and to employ a caster (dolly) type ground wheel or wheels which continuously support the main body of the rake. If the coupling embodies a stop to limit the downward fall of the rake, the ground wheel may optionally be so mounted that it normally remains out of ground contact, and comes into use only when an elevation in the ground ahead of the tractor is encountered to prevent the rake assembly from buckling incident to a stubbing action.

With the foregoing objects, advantages, and generally equivalent structures in mind, and in contemplation that additional objects, advantages and equivalent structures will become apparent as the description progresses, I will describe a preferred form of the invention as illustrated in the accompanying drawings, in which:

Figure 2 is a vertical sectional view taken on the line 2—2 of Figure 1, taken in the direction of the arrows.

Figure 3 is a vertical section of the raking assembly taken along line 3—3 in Figure 1, looking in the direction of the arrows.

Figure 4 is an enlarged fragmentary side elevation of a caster wheel and bracket assembly, as seen in Figure 2.

Figure 5 is an enlarged fragmentary top plan view of the general structure shown in Figure 4.

Figure 6 is an enlarged fragmentary sectional view of a coupling rod taken along line 6—6 in Figure 1.

Figures 7 and 8 illustrate a second form of a part of the invention, Figure 7 being a fragmentary top plan view, with parts broken away and shown in section, of the forward end portion of the rake, and Figure 8 being a side elevation of the same, as seen from line 8—8 in Figure 7.

Figure 1:
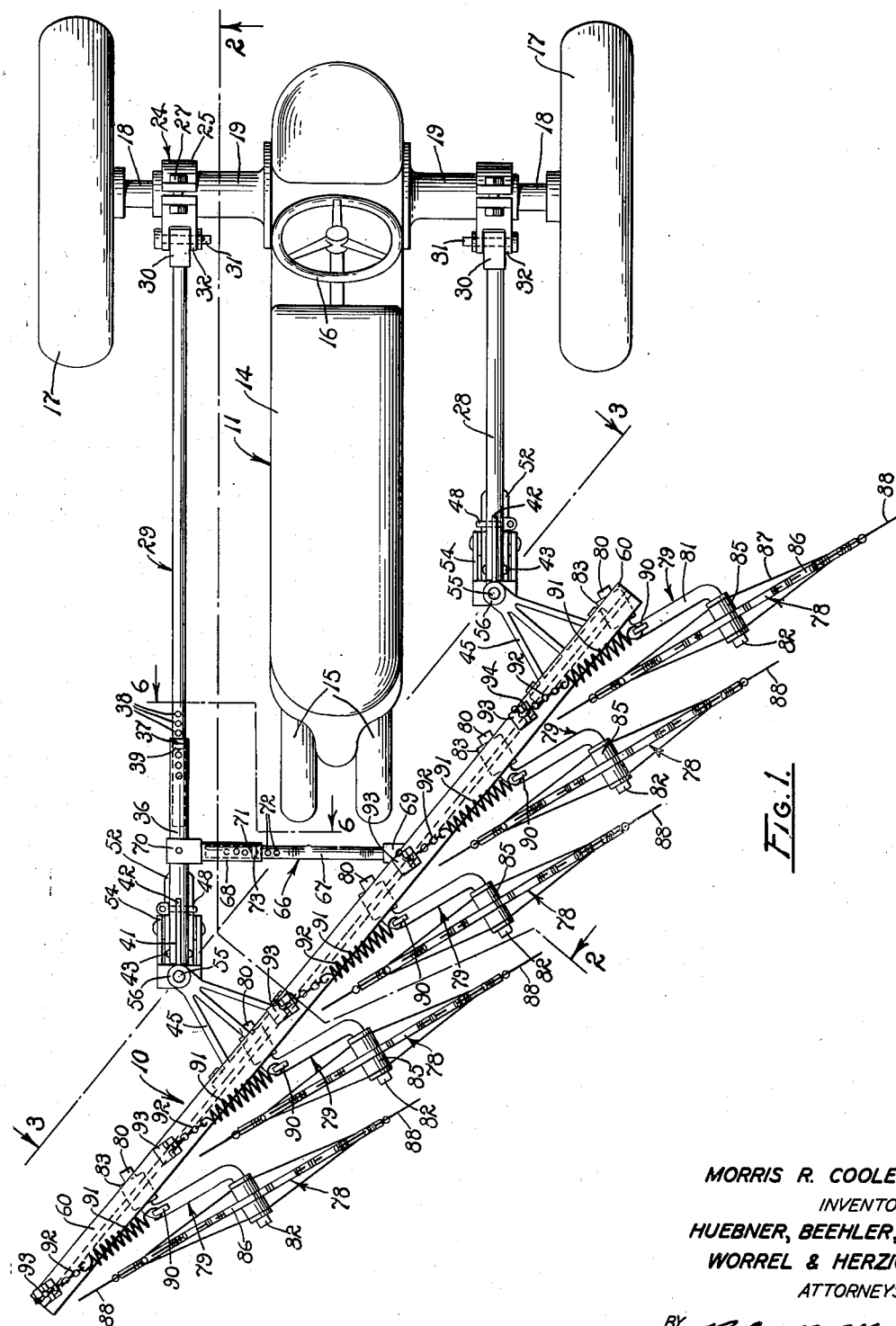
Figure 1 is a top plan view of the rake coupled to a tractor.

The pusher or buck rake of the instant invention is illustrated as a whole in Figure 1 of the drawings, and is indicated generally by the reference numeral 10, being mounted forwardly of a tractor 11 for motivation thereby. The tractor may be of any conventional design and the one herein shown is exemplary only, being provided with a chassis or body 14. The body is supported for earth traversing movement on a pair of steerable front wheels 15, manually directed by means of a steering wheel 16, and a pair of rear traction wheels 17. The traction wheels are mounted on the outer ends of driving axles 18 rotatably mounted in tubular axle housings 19 extending horizontally and laterally from a rear portion of the body of the tractor.

The pusher rake 10 is mounted on the tractor by attaching a pair of mounting clamps 24 to the tractor, one thereof to each of the axle housings 19. Each mounting clamp comprises a pair of clamping members 25 which are pivoted together at 26. The clamping members are formed in a manner to embrace their respective axle housings when pivoted toward each other. Bolts 27 pass through adjacent ears of the clamping members 25 to non-rotatably secure the mounting clamps to their respective axle housings. A rigid pusher rod extends forwardly from each of the mounting clamps 24, being identified as a left hand pusher rod 28 at the left hand side of the chassis of the tractor and a right hand pusher rod 29 at the right hand side of the chassis of the tractor. Each of the pusher rods 28 and 29 has a head 30 secured to the rearward end thereof whereby the pusher rods are pivotally secured to their respective mounting clamps 24 by means of a horizontal pivot bolt 31 passing through each head and a yoke comprising a pair of ears 32 on the mounting clamps straddling each head 30.

The left hand pusher rod 28 is of fixed length, whereas the right hand pusher rod 29 is longitudinally adjustable to regulate its length for changing the angle of the rake wheel frame hereinafter described. The right hand pusher rod has a telescopic forward end extension comprising a sleeve 36 having a plurality of openings 39 extending diametrically therethrough. The forward end of the main section of the right hand pusher rod has a plurality of openings 38 formed diametrically therethrough in spaced relation longitudinally of the pusher rod. The length of the right hand pusher rod is adjustable by inserting an adjusting pin 37 through a selected opening 39 and a selected one of the plurality of openings 38 in the pusher rod.

The forward end portions of the pusher rods 28 and 29 are slotted at 41 rearwardly from their forward terminal ends in vertical planes to receive plate quadrant or sectors 42 therein. Each plate quadrant is pivotally mounted at 43 in its respective slot 41 for relative vertical pivotal adjustment therebetween. A bearing sleeve 44 is welded or otherwise attached to the forward edge of each plate quadrant in an axially substantially vertical attitude. Each bearing sleeve 44 is an integral part of a bracket 45. The relative angularity between each pusher rod 28 and 29 and its respective bearing sleeve 44 may be adjusted as desired by providing an opening 46 horizontally through each pusher rod adjacent to its forward terminal end, a plurality of holes 47 through each plate quadrant 42 in a concentric pattern relative to the pivotal mounting 43, and utilizing an adjusting pin 48 for insertion through the opening 46 in the pusher rod and through a selected opening 47 in the plate quadrant.

The forward ends of the pusher rods are supported on terrain traversed thereby by means of a caster wheel 52 mounted under the forward end of each of the pusher rods. Each caster wheel is rotatably mounted at 53 in an arcuate yoke 54. An elongated cylindrical bearing spindle 55 is secured to the upper end of each yoke 54 and extends upwardly therefrom into a respective bearing sleeve 44 in which it is rotatable. A collar 56 is fitted over the upper end of each bearing spindle downwardly against the upper end of the respective bearing sleeve being pinned at 57 thereto to secure each yoke rotatably in its bearing sleeve.

The brackets 45, attached to the forward ends of each of the pusher rods 28 and 29, mount a beam 60 horizontally and angularly therebetween. The beam, in the present instance, is of I cross section, or is a so-called I beam, and has a series of openings 61 formed horizontally through its web in equal spaced relation longitudinally thereof. The beam 60 is mounted on the brackets in longitudinally adjustable positions by passing bolts 62 through the brackets 45 and through selected openings 61 in the beam securing the brackets thereto. This beam 60 and the brackets 45 or other suitable connection to the pusher rods 28 and 29 may be considered to be a frame for supporting raking elements to be described.

In order to impart horizontal rigidity between the beam and the pusher rods to prevent lateral sway of the beam and pusher rods, a telescopic strut 66 is secured between the right hand pusher rod 29 and the beam 60 at a point inwardly removed from its respective bracket 45. The telescopic strut comprises longitudinally telescopically adjustable members including an inner portion 67 and an outer portion 68, both of tubular form and of such diameters that the inner portion is slidable inwardly of the outer portion. An anchor member 69 is secured to the outer terminal end of the inner portion 67 of the telescopic strut and is bolted to the underside of the I beam 60 at a position substantially midway between the brackets 45. An attaching head 70 is secured to the terminal end of the outer portion 68 of the strut and is secured to a forward portion of the right hand pusher rod 29 with the strut extending perpendicularly to the length of the pusher rod and transversely of the direction of movement of the tractor and rake. The securing of one end of the telescopic strut 66 to the beam 60 and its opposite end to the right hand pusher rod 29 a distance removed from the bearing sleeve 44 provides in effect a rigid triangle between the secured ends of the strut and its respective bearing sleeve 44 which resists lateral thrust of the rake imparted thereto during raking operations. The length of the strut may be regulated by providing a single opening 71 diametrically through the outer portion 68 of the strut near its inner terminal end. A plurality of openings 72 are bored diametrically through the inner portion 67 of the strut in spaced relation longitudinally thereof adjacent to its inner end. The length of the strut is secured by passing the locking pin 73 through the opening 71 and through a selected opening 72 in the inner portion of the strut.

The beam 60 is mounted on the brackets 45 at the forward ends of the pusher rods 28 and 29 and is supported on the caster wheels 52, in a substantially horizontal attitude extending angularly (obliquely) to the direction of movement of the rake and tractor with the right hand end thereof considerably forward of its left hand end. The beam mounts a plurality of raking wheels 78 for individual elevational movement and free rotation. Each raking wheel is conveniently mounted on a crank arm 79, each of which is formed of a length of rod or shafting bent to substantially Z shape having a terminal shaft portion 80, preferably rearwardly directed intermediate arm portion 81 and a terminal axle portion 82. Each crank arm is rotatably mounted on the beam 60 by a bearing block 83 for each crank secured to the underside of the beam and rotatably receiving the shaft portion 80 of its respective crank arm. The bearing blocks are positioned in equally spaced relation longitudinally along the beam with the crank arms 79 extending preferably forwardly therefrom.

Each of the raking wheels 78 is formed with a central hub 85 and a concentric rim 86 interconnected by a plurality of spokes 87 extended radially therebetween. Each raking wheel is rotatably supported on a crank arm by rotatably mounting its hub 85 on the axle portion 82 of the crank arm. A plurality of preferably resilient teeth 88 extend outwardly from the rim of each raking wheel and terminate concentrically of the axis of the wheel. The crank arms 79 are so mounted on the beam 60 that the raking wheels carried thereon are peripherally in overlapping relation as viewed in alignment with the direction of movement of the tractor 11. The raking wheels have a diameter, and the teeth extend to a concentric dimension to an extent such that when the teeth are in normal ground or crop engagement on level land the intermediate arm portions 81 of the crank arms extend substantially horizontally. The raking wheels are in forwardly overlapping relation disposed in substantially parallel, vertical planes which inter-relationship prevails irrespective of the rise and fall of these wheels on their independent mountings.

The weight of each raking wheel is counterbalanced so that the teeth thereof will not gouge into soil traversed thereby any deeper than desired or may be floatingly suspended in engagement with rakeable substance on the ground with no appreciable ground engagement. This counterbalancing is accomplished by providing a lift arm 90 secured to each crank arm 79 at the juncture of the shaft portion 80 and the intermediate arm portion 81 thereof extending substantially vertically therefrom. One end of a helical tension spring 91 is secured to the upper end of arm 90; and to the opposite end of the spring 91 is attached a chain 92. Each chain is attached to the beam with its respective spring 91 under desired tension by employing an L shaped bracket 93 welded or otherwise secured to the upper surface of the beam 60 at a distance forwardly removed from each of the lift arms 90. Each bracket 93 is slotted downwardly at 94 from its upper terminal end for insertion of a portion of a chain to secure its spring under tension. Under certain operating conditions, and depending upon the weight of the raking wheel assemblies, a counter-balance may be omitted, but for most efficient operation, the spring counter-balance shown and described, or some equivalent counter-balancing means, is desired.

A second form of the invention is illustrated in Figures 7 and 8 of the drawings. In this form of the invention the forward right hand caster wheel 52 may be eliminated and another caster wheel (dolly) 97 substituted therefor. The latter is mounted at the forward right hand end of the beam 60 by providing a bearing bracket 98 secured to the rear face of the web portion of the beam and having an axially vertical sleeve portion 99. An upper plate 100 and a lower plate 101 are hinged together as at 102 on a horizontal axis axially transversely of the direction of movement of the caster. A helical compression spring 103 is located under initial compression between the upper and lower plates 100 and 101 at a distance removed from the hinged portion thereof to provide for cushioning therebetween. A spindle 104 attached to the upper surface of the upper plate 100 extends upwardly therefrom and is rotatably inserted in the sleeve portion 99 of the bracket 98. A collar 105 circumscribes the upper end of the spindle 104 and is pinned thereto as at 106. A yoke 107 is secured to the underside of the lower plate 101 and extends downwardly and arcuately rearwardly therefrom with the caster wheel 97 rotatably mounted at 108 adjacent to the lower terminal end of the yoke. Thus the caster wheel 97 is rotatably mounted on a vertical axis in the bearing bracket 98 and trails rearwardly therefrom and automatically aligns itself with the direction of movement of the rake, having a cushion mounting provided by the compression spring 103 between the upper and lower plates 100 and 101.

While the rake illustrated herein is shown as a "front" rake, the pusher or back principle is adaptable to a side mounting rake. An important factor in either front or side mounting is to employ a coupling which is adequately rigid for purposes of propulsion and to prevent side sway incident to lateral thrust of the raking wheels.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Elevational movement of the rake permitting it to depart from the ground supported attitude and/or elevation of the tractor is a significant attribute in raking over uneven ground. The pivotal mounting of the pusher rods 28 and 29 and the support of the forward ends thereof on swiveled ground wheels, or equivalent ground engaging elements, to carry the main weight of the rake permits this pusher rake of the Morrill type to accommodate uneven raking surfaces while the individual elevational movement of the raking wheels gathers rakeable substances from the hills and depressions with substantially equal facility.

Having described my invention, what I claim as new and desire to secure by Letters Patent is:

1. Agricultural apparatus adapted to be mounted on and pushed by a tractor having a body and a rear axle housing and comprising, a pair of substantially parallel pusher rods, means operatively associated with said rods for pivotally securing the rear ends of said pusher rods to the rear axle housing each of said rods is adapted to be disposed in laterally spaced relation to opposite sides of the body of said tractor, an agricultural implement disposed at the forward ends of said rods and extending therebetween, ground-engaging means supporting the forward ends of said rods and said implement, independent adjustable means mounting said implement and ground engaging means on the forward ends of said rods to provide for vertical adjustment of the implement relative to the ground, and a strut secured at one end to one of said rods and extending in a direction generally normal to said one of the rods and transversely of the direction of travel of said implement, the opposite end of said strut being connected to said implement intermediate said rods, the pivotal connection for the rear ends of said rods permitting the implement to follow the terrain of the ground traversed independently of a tractor when said rods are pivotally secured thereto.

2. Agricultural apparatus adapted to be mounted on and pushed by a tractor having a body and a rear axle housing and comprising, a pair of substantially parallel pusher rods, means operatively associated with said rods for pivotally securing the rear ends of said pusher rods to the rear axle housing, each of said rods is adapted to be disposed in laterally spaced relation to opposite sides of the body of said tractor, one of said rods comprising front and rear telescoping sections and includes means for releasably locking said rod sections in desired telescoping relationship, an agricultural implement disposed at the forward ends of said rods and extending therebetween, ground engaging means supporting the forward ends of said rods and said implement, independent adjustable means mounting said implement and ground-engaging means on the front section of said one of the rods and to the forward end of the other one of said rods to provide for vertical adjustment of the implement relative to the ground, a strut comprising a pair of telescoping strut sections one of which is connected to said front rod section and the other of which is connected to said implement intermediate said rods, said strut extending in a direction transversely of the direction of travel of said implement, and means operatively associated with said strut sections for releasably locking the same in desired telescoping relationship, the pivotal connection for the rear ends of said rods permitting the implement to follow the terrain of the ground traversed independently of a tractor when said rods are pivotally secured thereto.

References Cited in the file of this patent

UNITED STATES PATENTS

| | | |
|---|---|---|
| 614,137 | Seitz | Nov. 15, 1898 |
| 774,060 | Fox | Nov. 1, 1904 |
| 1,197,712 | Dain | Sept. 12, 1916 |
| 2,240,552 | Cope et al. | May 2, 1941 |
| 2,296,065 | Slamp | Sept. 15, 1942 |
| 2,447,354 | Morrill | Aug. 17, 1948 |
| 2,472,260 | Morrill | June 7, 1949 |
| 2,487,144 | Kriedeman | Nov. 8, 1949 |
| 2,531,934 | Crose | Nov. 28, 1950 |
| 2,635,411 | Hicks | Apr. 21, 1953 |

FOREIGN PATENTS

| | | |
|---|---|---|
| 329,566 | France | June 4, 1903 |